A. SCHROEDER.
METALLIC CONTAINER.
APPLICATION FILED OCT. 30, 1919.
1,344,456.
Patented June 22, 1920.
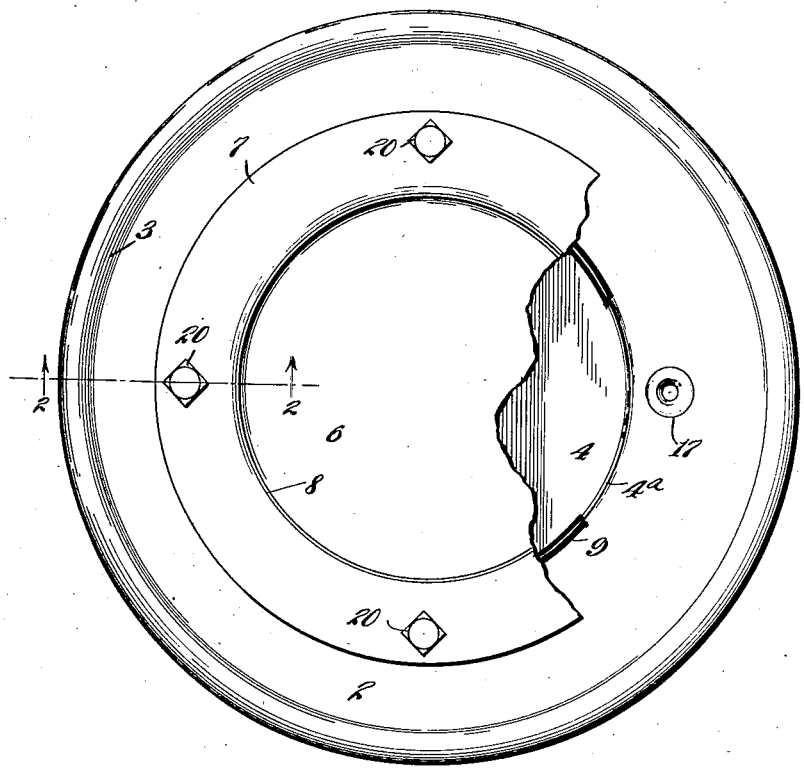
Fig. 1.
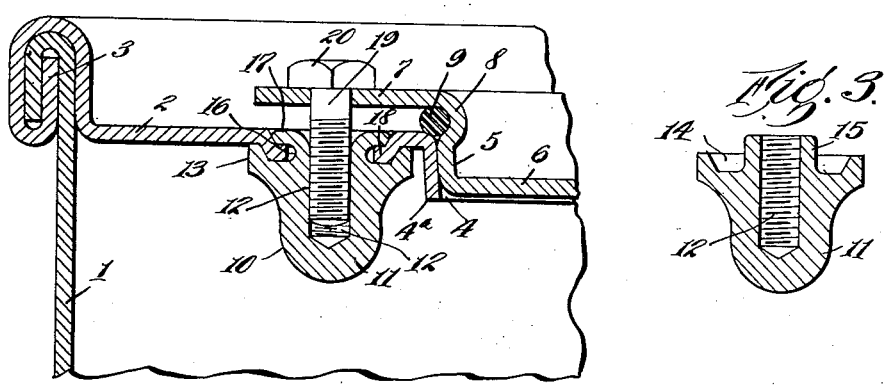
Fig. 2.
Fig. 3.
Inventor,
A. Schroeder
By John A. Bommhardt
Atty.

UNITED STATES PATENT OFFICE.

ANTHONY SCHROEDER, OF CLEVELAND, OHIO.

METALLIC CONTAINER.

1,344,456.   Specification of Letters Patent.   Patented June 22, 1920.

Application filed October 30, 1919. Serial No. 334,554.

*To all whom it may concern:*

Be it known that I, ANTHONY SCHROEDER, a citizen of the United States, residing at Cleveland, in the county of Cuyahoga and State of Ohio, have invented certain new and useful Improvements in Metallic Containers, of which the following is a specification.

This invention relates to a container for liquids and the like and is particularly adapted for use in transporting oils which are highly volatile and which are therefore difficult to transport without leakage.

The particular object of the invention is to provide a container with an easily removable cover and one in which the fastening means are so designed as to permit of frequent removal thereof and which at the same time may be effectively resealed.

Further objects of the invention are to provide a construction which will be simple and efficient in operation and which will entail the use of only a minimum of operating parts, these parts being so constructed as to prevent any possibility of leakage.

With this end in view the invention consists of certain structures, arrangement and combinations of parts illustrated specifically, described and pointed out in the accompanying description and claims.

Referring to the drawings in which like reference numerals designate similar parts of reference throughout the various views, Figure 1 is a plan view of a container constructed in accordance with the principles above set forth; Fig. 2 is a sectional detail on the line 2—2 of Fig. 1 and Fig. 3 is a detail view of the nut showing the form in which it is applied to the container.

The container comprises a cylindrical sheet metal body 1 which has secured to one of its ends a head 2 by means of an interlocking seam indicated at 3. The head 2 is provided with a central opening 4 formed by turning the metal downwardly to produce a flange 4ª, this flnage is slightly inclined from the inside of the container to provide a frictional engagement with a like flange 5 formed as part of the cover 6.

The cover is also provided with a horizontal or outwardly extending flange 7 by means of which the same is securely clamped in position. Intermediate of the wall 5 and the flange 7 the cover is provided with an annular bead 8 the outside of which contains a circular elastic gasket 9. This gasket is preferably endless and due to its elasticity permits of being slipped from the bottom of the wall 5 into place where it is retained in the bead 8. The head has secured to it intermediate of the opening 4 and the joint 3 a plurality of peculiarly shaped nuts 10. These nuts consist of a main body portion 11 provided with an internally threaded bore 12, said bore extending only partially through the nut. The body portion 11 is enlarged at 13 and at this point is provided with an annular groove 14. The inner wall of said groove forms a projection 15 which after being placed through an aperture 16 formed in the head 2 is curled over as at 17 to securely clamp the metal 18 of the head 2 therebetween. This joint may if desired be welded but experience has shown that this is unnecessary. A bolt 19 provided with a head 20 is then passed through a suitable opening in the flange 7 of the cover and is threaded into the nut 10. By this means leakage is prevented through the nut, for with all other devices of this character with which I am familiar the nut heretofore used for a like purpose consists of an ordinary nut with the aperture 12 extending entirely therethrough, and the nut heretofore has been merely welded in place. Furthermore, due to the presence of the gasket 9, any leakage at the cover joint is prevented.

While I have shown and described this particular form of invention it is obvious that the same is capable of various modifications and I do not wish to limit myself further in the construction of the same than is required by the state of the art or that which comes within the scope of the appended claims.

I claim:

1. The combination of a metal barrel head having an opening therein, a cover adapted to fit into said opening, and fastening means to hold the cover tightly in place comprising a nut closed at its inner end and permanently sealed to the inside of the head, and a screw extending through an opening in the cover and threaded into said nut, said screw adapted to tightly hold the cover in place.

2. The combination of a barrel having an opening in the head thereof, a cover fitting said opening and having an outwardly extending flange, closed nuts permanently sealed to the inside of the head, and screws extending through the flange of the cover and into said nuts.

3. The combination of a barrel having an opening in the head thereof, a cover fitting said opening and having an outwardly extending flange closed nuts fastened to the inside of the head, and screws extending through the flange of the cover and into said nuts, the outer ends of said nuts extending through openings in the head and having grooves receiving the edges of the head around said openings and a wall of the grooves being swaged down upon said edges, to hold the nuts in place.

4. The combination of a barrel having an opening in the head thereof and holes around said opening, nuts on the inside of the head, the nuts having grooves in the outer ends thereof and a central rim extending through said holes, the edges of the head around said holes fitting in the grooves and the rim being swaged down upon said edges to hold the nuts in place, a cover for the opening in the head, and fastening means for the cover including screws extending into said nuts.

In testimony whereof I do affix my signature in presence of two witnesses.

ANTHONY SCHROEDER.

Witnesses:
JOHN A. BOMMHARDT,
EUGENE A. CANNING.